(12) United States Patent
Zhou et al.

(10) Patent No.: US 11,288,531 B2
(45) Date of Patent: Mar. 29, 2022

(54) IMAGE PROCESSING METHOD AND APPARATUS, ELECTRONIC DEVICE, AND STORAGE MEDIUM

(71) Applicant: SHENZHEN SENSETIME TECHNOLOGY CO., LTD., Shenzhen (CN)

(72) Inventors: Guanbao Zhou, Shenzhen (CN); Guiming Zhang, Shenzhen (CN); Qiutong He, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 5 days.

(21) Appl. No.: 16/914,686

(22) Filed: Jun. 29, 2020

(65) Prior Publication Data

US 2020/0327353 A1  Oct. 15, 2020

Related U.S. Application Data

(63) Continuation of application No. PCT/CN2019/101384, filed on Aug. 19, 2019.

(30) Foreign Application Priority Data

Mar. 11, 2019  (CN) .......................... 201910181078.0

(51) Int. Cl.
*G06K 9/40* (2006.01)
*G06K 9/00* (2006.01)
*G06T 3/40* (2006.01)

(52) U.S. Cl.
CPC ........... *G06K 9/40* (2013.01); *G06K 9/00228* (2013.01); *G06K 9/00369* (2013.01); *G06K 9/00718* (2013.01); *G06T 3/40* (2013.01)

(58) Field of Classification Search
CPC ........... G06K 9/00362; G06K 2209/01; G06K 9/00885; G06K 9/00288; G06K 9/00369;
(Continued)

(56) References Cited

U.S. PATENT DOCUMENTS

2005/0013488 A1\* 1/2005 Hashimoto ........ G06K 9/00369
382/216
2005/0036044 A1\* 2/2005 Funakura ............... H04N 5/272
348/239
(Continued)

FOREIGN PATENT DOCUMENTS

CN    101216885 A    7/2008
CN    105227918 A    1/2016
(Continued)

OTHER PUBLICATIONS

Human Recognition for Following Robots with a Kinect Sensor (Year: 2016).\*
(Continued)

*Primary Examiner* — Nizar N Sivji
(74) *Attorney, Agent, or Firm* — Cooper Legal Group, LLC

(57) ABSTRACT

An image processing method and apparatus, an electronic device, and a storage medium are provided. The method includes: determining a first image and first location information of a target region according to a reference image; cropping the target region to obtain a cropped image; performing noise reduction on the cropped image, and determining second location information of a face region and third location information of a body region; determining fourth location information of the face region and fifth location information of the body region in the first image according to the first location information, the second location information, and the third location information; and
(Continued)

processing the first image according to the fourth location information and the fifth location information.

18 Claims, 4 Drawing Sheets

(58) Field of Classification Search
CPC .. G06K 9/00248; G06K 9/40; G06K 9/00228; G06K 9/00718; G06K 9/3233; G06T 3/40
See application file for complete search history.

(56) References Cited

U.S. PATENT DOCUMENTS

| | | | |
|---|---|---|---|
| 2014/0176612 A1* | 6/2014 | Tamura | G06T 3/40 345/660 |
| 2014/0226877 A1* | 8/2014 | Je | G06K 9/00926 382/118 |
| 2016/0065861 A1* | 3/2016 | Steinberg | G06K 9/00228 348/239 |
| 2017/0039417 A1* | 2/2017 | Saruta | G06K 9/00228 |
| 2019/0311192 A1 | 10/2019 | Murphy et al. | |
| 2019/0370591 A1* | 12/2019 | Chang | G06K 9/00228 |
| 2020/0034657 A1* | 1/2020 | Yi | G06K 9/6209 |

FOREIGN PATENT DOCUMENTS

| | | |
|---|---|---|
| CN | 105227918 B | 10/2016 |
| CN | 106845432 A | 6/2017 |
| CN | 107644204 A | 1/2018 |
| CN | 109948494 A | 6/2019 |
| WO | 2018080547 A1 | 5/2018 |
| WO | 2018173947 A1 | 9/2018 |

OTHER PUBLICATIONS

A Unified Framework for Concurrent Pedestrian and Cyclist Detection (Year: 2007).*
Identifying Noncooperative Subjects at a Distance Using Face Images and Inferred Three-Dimensional Face Models (Year: 2009).*
First Office Action of the Chinese application No. 201910181078.0, dated Apr. 17, 2020, 8 pgs.
First Office Action of the Japanese application No. 2020-533126, dated Aug. 24, 2021, 8 pgs.
International Search Report in the international application No. PCT/CN2019/101384, dated Nov. 29, 2019, 2 pgs.

* cited by examiner

IMAGE PROCESSING METHOD AND APPARATUS, ELECTRONIC DEVICE, AND STORAGE MEDIUM

CROSS-REFERENCE TO RELATED APPLICATIONS

The present disclosure is a U.S. continuation application of International Application No. PCT/CN2019/101384, filed on Aug. 19, 2019, which claims priority to Chinese Patent Application No. 201910181078.0, filed on Mar. 11, 2019. The disclosures of International Application No. PCT/CN2019/101384 and Chinese Patent Application No. 201910181078.0 are incorporated herein by reference in their entireties.

BACKGROUND

In the related technology, video frames including a target object can be searched from a large variety of videos according to a reference image of the target object by using a face recognition technology. However, if feature information of the target object in the reference image is incomplete (for example, only a body region or a face region is captured), the region corresponding to the searched feature information is required to be matched in the search process, for example, multiple video frames are searched in the face region, and the body region matching the face region is determined in the video frames. However, multiple regions which may interfere with matching are generally included in the video frames; therefore, it is difficult to match the face region and the body region.

SUMMARY

The present disclosure relates to the technical field of computers, and in particular, to image processing methods and apparatuses, electronic devices, and storage media.

Embodiments of the present disclosure provide an image processing method and apparatus, an electronic device, and a storage medium.

An image processing method provided according to one aspect of the embodiments of the present disclosure includes:

determining, according to a reference image, a first image including a target object in the reference image from multiple images to be processed, and first location information of a target region where the target object is located in the first image;

performing cropping processing on the target region to obtain a cropped image;

performing noise reduction processing on the cropped image according to the reference image, and determining second location information of a face region of the target object and third location information of a body region of the target object in the cropped image;

determining fourth location information of the face region of the target object and fifth location information of the body region of the target object in the first image according to the first location information, the second location information, and the third location information; and processing the first image according to the fourth location information and the fifth location information to obtain a second image, where the second image includes labeling information for the face region and the body region of the target object.

An image processing apparatus provided according to another aspect of the embodiments of the present disclosure includes:

a first determining module, configured to determine, according to a reference image, a first image including a target object in the reference image from multiple images to be processed, and first location information of a target region where the target object is located in the first image;

a cropping module, configured to perform cropping processing on the target region to obtain a cropped image;

a noise reduction module, configured to perform noise reduction processing on the cropped image according to the reference image, and determine second location information of a face region of the target object and third location information of a body region of the target object in the cropped image;

a second determining module, configured to determine fourth location information of the face region of the target object and fifth location information of the body region of the target object in the first image according to the first location information, the second location information, and the third location information; and a processing module, configured to process the first image according to the fourth location information and the fifth location information to obtain a second image, where the second image includes labeling information for the face region and the body region of the target object.

An electronic device provided according to one aspect of the embodiments of the present disclosure includes:

a processor; and a memory configured to store processor-executable instructions.

The processor is configured to execute the image processing method.

A computer-readable storage medium provided according to one aspect of the embodiments of the present disclosure has computer program instructions stored thereon, where when the computer program instructions are executed by a processor, the image processing method is implemented.

It should be understood that the above general description and the following detailed description are merely exemplary and explanatory, and are not intended to limit the present disclosure.

Other features and aspects of the present disclosure can be described more clearly according to the detailed descriptions of the exemplary embodiments in the accompanying drawings below.

BRIEF DESCRIPTION OF DRAWINGS

The drawings here incorporated in the specification and constituting a part of the specification describe the embodiments of the present disclosure and are intended to explain the technical solutions of the present disclosure together with the specification.

DETAILED DESCRIPTION

Figure 1:
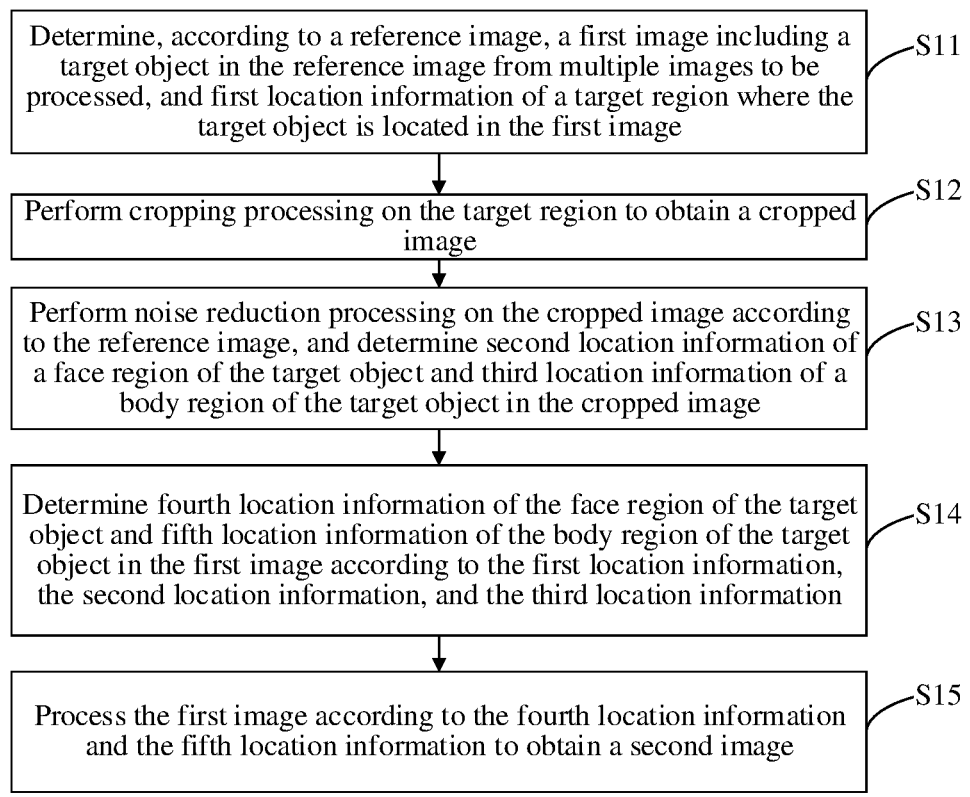
FIG. 1 is a flowchart illustrating an image processing method according to embodiments of the present disclosure.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" in the present disclosure only describes an association relation between associated objects, indicating that three relations may exist, for example, A and/or B may indicate three conditions, i.e., A exists separately, A and B exist at the same time, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included.

In addition, numerous details are given in the following detailed description for the purpose of better explaining the present disclosure. It should be understood by persons skilled in the art that the present disclosure can still be implemented even without some of those details. In some examples, methods, means, elements, and circuits that are well known to persons skilled in the art are not described in detail so that the principle of the present disclosure becomes apparent.

FIG. 1 is a flowchart illustrating an image processing method according to embodiments of the present disclosure. As shown in FIG. 1, the method includes:

at step S11, a first image including a target object in the reference image and first location information of a target region where the target object is located in the first image are determined, according to a reference image, from multiple images to be processed;

at step S12, cropping processing is performed on the target region to obtain a cropped image;

at step S13, noise reduction processing is performed on the cropped image according to the reference image, and second location information of a face region of the target object and third location information of a body region of the target object are determined in the cropped image;

at step S14, fourth location information of a face region of the target object and fifth location information of a body region of the target object are determined in the first image according to the first location information, the second location information, and the third location information;

at step S15, the first image is processed according to the fourth location information and the fifth location information to obtain a second image, where the second image includes labeling information for the face region and the body region of the target object.

According to the image processing method in the embodiments of the present disclosure, a target region where a target object is located can be determined in a first image including the target object, and is cropped, a face region and a body region of the target object are determined in the cropped image, and an interference region can be filtered out to reduce the difficulty of matching the face region and the body region of the target object.

In a possible implementation, the image processing method may be performed by a terminal device. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer-readable instructions stored in a memory. Alternatively, the image processing method is executed by a server.

In a possible implementation, the reference image can be an image selected or uploaded by a user, or video frames of a video to be detected. Feature information of the target object can be obtained from the reference image. As an example, the video to be detected includes videos captured by video obtaining devices distributed at multiple geographic locations within a preset period of time. For example, the video obtaining devices can be cameras distributed in different regions or streets. The cameras can send the captured videos to a server, and the server summarizes the videos captured by the cameras to obtain the video to be detected. For example, the preset period of time can be one day, one hour, etc., and a video obtained by a certain camera within the preset period of time can be used as the video to be detected. As another example, a video to be detected includes videos captured by cameras distributed at multiple geographic locations within a preset period of time. For example, the video to be detected can be videos captured by cameras distributed in multiple streets between 9:00 a.m. and 10:00 a.m.

The video to be detected can include video frames including a target object. For example, the video to be detected is a surveillance video, the target object is a suspect, and therefore, the video to be detected can include video frames including the suspect. Furthermore, video frames of the video to be detected can have timestamps for indicating time information when the video frames are obtained. The video frames of the video to be detected can include geographic location information for indicating the geographic location where video obtaining devices (e.g. cameras) which obtain the video frames are located, or the geographic location where regions captured by video obtaining devices are located.

In a possible implementation, the reference image can be an image including at least one of a face region and a body region of a target object. Feature information of a target object can be extracted from the image. The reference image is an image including a target object (e.g. a suspect), and can be, for example, a photo including the target object, in which at least one of a face region and a body region of a target object is included. The photo can be uploaded to a server. In an example, the sharpness of a face region of a target object in a reference image can be low, or a reference image only includes a body region of a target object or a face region of a target object.

In a possible implementation, a reference image can include multiple objects, and a target object can be one of the multiple objects, and can be selected from the multiple objects. For example, a face region or a body region of the target object can be selected.

In a possible implementation, a step S11 may include: obtaining feature information of the target object in the reference image, where the feature information includes face feature information and/or body feature information; determining, according to the feature information of the target object, the first image including the target object from the multiple images to be processed; and determining the first location information of the target region where the target object is located in the first image.

In a possible implementation, a target object in a reference image can be performed feature extraction. In an example, only a target object is included in a reference image or an object in a video frame. For example, a reference image only includes at least one of a face region and a body region of a target object. At least one of a face region and a body region of a target object can be performed feature extraction to obtain feature information of the target object. For example, a face region of a target object is performed feature extraction to obtain face feature information of the target object. For another example, a body region of a target object is performed feature extraction to obtain body feature information of the target object. In an example, a reference image or a video frame can include multiple objects in which a face region or a body region of a target object can be selected. For example, at least one of a face region and a body region of a target object is selected, and feature information of the selected region can be extracted. For example, if the selected region is a face region of a target object, then feature information of the face region of the target object can be extracted. For another example, if the selected region is a body region of a target object, then feature information of the body region of the target object can be extracted.

In an example, face feature information can include feature information determined according to a face key point. The feature information includes, for example, feature information for indicating information such as the position and the shape of the facial feature in a face, and can include feature information for indicating information such as the human skin color. Body feature information can include feature information determined according to a body key point. The feature information includes, for example, feature information for indicating information such as the height, the body shape, the leg length, and the arm length, and can include feature information for indicating information such as the clothing style and color.

In an example, the selected region can be performed feature extraction by a convolutional neural network, etc. to obtain feature information of a target object, i.e., face feature information or body feature information is obtained by a convolutional neural network.

In a possible implementation, search can be conducted in multiple images to be processed according to feature information of the target object. In an example, the multiple images to be processed can be multiple video frames in a video to be detected, or multiple images in an image library, which are not limited in the embodiments of the present disclosure. In an example, feature information of objects in an image to be processed can be obtained, and is compared with feature information of a target object to obtain the feature similarity between the target object and the objects. Furthermore, an object having the feature similarity greater than or equal to a similarity threshold can be determined as a target object, and the image to be processed including the target object can be determined as the first image. In an example, the image to be processed includes multiple video frames of the video to be detected. A video frame including a target object, i.e., a first image, can be determined from the multiple video frames by the mode.

In a possible implementation, first location information of a target region where a target object is located is determined in a first image. In an example, the target region can include a target object in a first image determined according to feature information of the target object. For example, if the feature information is face feature information, then the target region is a region including a face region of a target object; or, the feature information is body feature information, then the target region is a region including a body region of a target object; or, the feature information is body feature information and face feature information, then the target region is a region including a body region and a face region of the target object.

Figure 2:
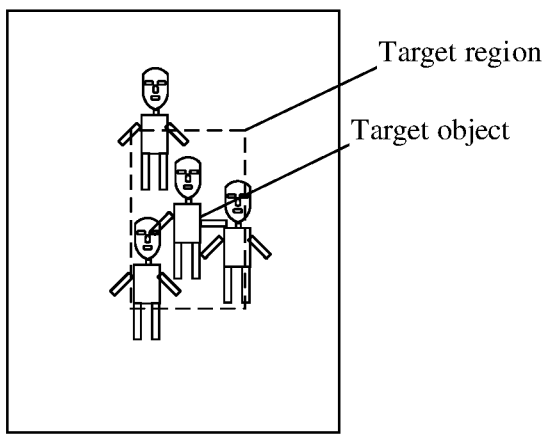
FIG. 2 is a schematic diagram of a target region according to embodiments of the present disclosure.

FIG. 2 is a schematic diagram of a target region according to embodiments of the present disclosure. As shown in FIG. 2, the region selected by a dotted line is the target region, i.e., the region where a target object is located. The size of the target region can be greater than that of a face region or a body region of a target object. For example, the feature information is face feature information. However, when the number of objects in a first image is large, multiple body regions may overlap or shield; therefore, it is difficult to determine a body region matching a face region of a target object. In this case, the target region may include a face region and multiple adjacent body regions of the target object. For another example, the feature information is body feature information. However, when the number of objects in a first image is large, multiple face regions may overlap or shield; therefore, it is difficult to determine a face region matching a body region of a target object. In this case, the target region may include a body region and multiple adjacent face regions of the target object.

In a possible implementation, the target region can be a region of a preset size. For example, the resolution of a first image is 1280×1024. In order to facilitate subsequent processing, an image having the resolution of 800×600 and including a target object is required to be obtained. For example, the subsequent recognition can be executed by a neural network, and an image having the resolution of 800×600 can be input by the neural network; therefore, a target region having the size of 800×600 and including a target object can be determined in a first image.

In a possible implementation, at step S12, the target region can be cropped, etc. to obtain a new image (i.e., a cropped image). For example, a target region can be cropped, etc. to obtain an image (i.e., a cropped image) having the resolution of 800×600 for processing by the neural network.

In a possible implementation, at step S13, the cropped image can be recognized to determine second location information of a face region of a target object in the cropped image, and third location information of a body region of the target object in the cropped image. In an example, the recognition can be implemented by a convolutional neural network, etc., and the recognition mode is not limited in the embodiments of the present disclosure.

In a possible implementation, the feature information of the target object includes face feature information of the target object. Second location information of a face region can be determined in a cropped image according to the face feature information, and third location information of a body region matching the face region (i.e., a body region of a target object) can be determined.

In a possible implementation, a step S13 may include: determining, according to the face feature information of the target object in the reference image, the second location information of the face region of the target object in the cropped image; determining location information of multiple body regions in the cropped image; and performing noise reduction processing on the multiple body regions in the cropped image according to the second location information, and determining the third location information of the body region of the target object in the cropped image.

In a possible implementation, second location information of a face region of the target object in the cropped image can be determined according to face feature information of the target object. For example, the second location information includes coordinate information of a first selection box selecting the face region of the target object (for example, the coordinate of four vertexes of a first selection box in a cropped image). The face of the target object can be recognized in the cropped image, and is selected. The face of the target object is recognized in the cropped image so as to quickly and accurately obtain second location information of the face region of the target object, reduce the noise interference during recognition, and improve the recognition precision.

In a possible implementation, location information of multiple body regions can be obtained in a cropped image. For example, coordinate information of a second selection box selecting all the body regions in the cropped image can be obtained. Multiple body regions in the cropped image can be performed noise reduction according to second location information of a face region of a target object, and a body region matching the face region of the target object is determined, i.e., third location information of the body region of the target object in the cropped image. For example, coordinate information of a selection box selecting the body region of the target object is determined.

In a possible implementation, performing noise reduction processing on body regions in the cropped image according to the second location information, and determining the third location information of the body region of the target object in the cropped image includes: filtering out, according to the second location information and location information of the body regions in the cropped image, a non-target body region in the cropped image to obtain a first body region; screening a second body region from the first body region according to the distance between the coordinate of the central position of the first selection box and the coordinate of an upper edge midpoint of the second selection box; and determining the body region of the target object and the third location information of the body region of the target object from the second body region according to an included angle between a line connecting the central position of the second selection box of the second body region to the central position of the first selection box and the vertical direction.

In a possible implementation, a non-target body region in a cropped image can include a body region that does not obviously match a face region of the target object, e.g. a body region that has a large deviation from a face region. In an example, the second location information includes coordinate information of a first selection box selecting the face region of the target object, and location information of a body region in the cropped image includes coordinate information of a second selection box selecting the body region. The non-target body region includes at least one of the following: a body region corresponding to a second selection box having no intersection with the first selection box; a body region corresponding to a second selection box having the vertical coordinate of the central position greater than or equal to the vertical coordinate of a lower edge of the first selection box; a body region corresponding to a second selection box having the horizontal coordinate of a left edge greater than or equal to the horizontal coordinate of a right edge of the first selection box; and a body region corresponding to a second selection box having the horizontal coordinate of a right edge less than or equal to the horizontal coordinate of a left edge of the first selection box. After the non-target body region is filtered out, the remaining body region in the cropped image is the first body region.

In a first example, a first selection box selecting a face region of a target object should have intersection with a selection box selecting a body region of a cropped image. For example, a lower edge of a first selection box may be located below an upper edge of a selection box of a body region of a target object. Therefore, a second selection box having no intersection with the first selection box of the face region of the target object can be excluded, i.e., the body region corresponding to the second selection box having no intersection with the first selection box is a non-target body region.

In a second example, a first selection box selecting a face region of a target object should be higher than a selection box selecting a body region of a target object, and a lower edge of the first selection box should be higher than the central position of the selection box selecting the body region of the target object. Therefore, a second selection box having the central position higher than the lower edge of the first selection box can be excluded, i.e., the body region corresponding to the second selection box having the vertical coordinate of the central position greater than or equal to the vertical coordinate of the lower edge of the first selection box is a non-target body region.

In a third example, a selection box selecting a body region of a target object should be aligned with or proximately aligned with a first selection box. Therefore, a selection box of a body region having a large deviation in the vertical direction can be excluded, i.e., a body region corresponding to a second selection box having the horizontal coordinate of a left edge greater than or equal to the horizontal coordinate of a right edge of the first selection box, and a body region corresponding to a second selection box having the horizontal coordinate of a right edge less than or equal to the horizontal coordinate of a left edge of the first selection box can be determined as non-target body regions.

In this way, multiple noisy body regions can be filtered to improve the recognition efficiency and improve the recognition accuracy.

In a possible implementation, a body region matching a face region of a target object can be determined from a first body region, i.e., a body region of a target object.

In one example, the distance between the coordinate of the central position of a first selection box, and the coordinate of an upper edge midpoint of the second selection box can be determined, and a body region corresponding to the closest second selection box is determined, i.e., a second body region. If only one closest second selection box is included, the second body region corresponding to the second selection box can be determined as a body region of a target object.

In one example, if multiple second selection boxes having the same distance are included, i.e., multiple second body regions are included, an included angle between a line connecting the central position of a second selection box of a second body region to the central position of the first selection box and the vertical direction can be determined. The smaller the included angle, the closer the direction of the connecting line with respect to the vertical direction. A second body region of a second selection box having the smallest included angle can be determined as a body region of the target object. In an example, the cosine value of the included angle can be determined, and a second body region corresponding to a second selection box having the largest cosine value of the included angle can be determined as a body region of the target object. Furthermore, third location information of the body region of the target object can be determined.

In this way, the body region of the target object can be determined by calculating the coordinate to improve the processing efficiency.

In a possible implementation, the feature information of the target object includes body feature information of the target object. Third location information of a body region can be determined in a cropped image according to the body feature information, and second location information of a face region matching the body region (i.e., a face region of a target object) can be determined.

In a possible implementation, a step S13 may include: determining, according to the body feature information of the target object in the reference image, the third location information of the body region of the target object in the cropped image; determining location information of multiple face regions in the cropped image; and performing noise reduction processing on the multiple face regions in the cropped image according to the third location information, and determining the second location information of the face region of the target object in the cropped image.

In a possible implementation, third location information of a body region of the target object in the cropped image can be determined according to body feature information of the target object. For example, the third location information includes coordinate information of a third selection box selecting the body region of the target object (e.g. the coordinate of four vertexes of a third selection box in a cropped image). The body of the target object can be recognized in the cropped image, and is selected. The body of the target object is recognized in the cropped image so as to quickly and accurately obtain third location information of the body region of the target object, reduce the noise interference during recognition, and improve the recognition precision.

In a possible implementation, location information of multiple face regions can be obtained in a cropped image. For example, coordinate information of a fourth selection box selecting all the face regions in the cropped image can be obtained. Multiple face regions in the cropped image can be performed noise reduction according to third location information of a body region of a target object, and a face region matching the body region of the target object is determined, i.e., second location information of the face region of the target object in the cropped image. For example, coordinate information of a selection box selecting the face region of the target object is determined.

In a possible implementation, performing noise reduction processing on the multiple face regions in the cropped image according to the third location information, and determining the second location information of the face region of the target object in the cropped image includes: filtering out, according to the third location information and location information of the face regions in the cropped image, a non-target face region in the cropped image to obtain a first face region; screening a second face region from the first face region according to the distance between the coordinate of an upper edge midpoint of the third selection box and the coordinate of the central position of the fourth selection box; and determining the face region of the target object and the second location information of the face region of the target object from the second face region according to an included angle between a line connecting the central position of the fourth selection box of the second body region to the central position of the third selection box and the vertical direction.

In a possible implementation, a non-target face region in a cropped image can include a face region that does not obviously match a body region of the target object, e.g. a face region that has a large deviation from a body region. In an example, the third location information includes coordinate information of a third selection box selecting the body region of the target object, and location information of a face region in the cropped image includes coordinate information of a fourth selection box selecting the face region. The non-target face region includes at least one of the following: a face region corresponding to a fourth selection box having no intersection with the third selection box; a face region corresponding to a fourth selection box having the vertical coordinate of a lower edge less than or equal to the vertical coordinate of the central position of the third selection box; a face region corresponding to a fourth selection box having the horizontal coordinate of a left edge greater than or equal to the horizontal coordinate of a right edge of the third selection box; and a face region corresponding to a fourth selection box having the horizontal coordinate of a right edge less than or equal to the horizontal coordinate of a left edge of the third selection box. After the non-target face region is filtered out, the remaining face region in the cropped image is the first face region.

In a first example, a third selection box selecting a body region of a target object should have intersection with a selection box selecting a face region of a cropped image. For example, an upper edge of a third selection box may be located below a lower edge of a selection box of a face region of a target object. Therefore, a fourth selection box having no intersection with the third selection box of the body region of the target object can be excluded, i.e., the face region corresponding to the fourth selection box having no intersection with the third selection box is a non-target face region.

In a second example, a third selection box selecting a body region of a target object should be lower than a selection box selecting a face region of a target object, and the central position of the third selection box should be lower than a lower edge of the selection box selecting the face region of the target object. Therefore, a fourth selection box having the lower edge lower than the central position of the third selection box can be excluded, i.e., the face region corresponding to the fourth selection box having the vertical coordinate of the lower edge less than or equal to the vertical coordinate of the central position of the third selection box is a non-target face region.

In a third example, a selection box selecting a face region of a target object should be aligned with or proximately aligned with a third selection box. Therefore, a selection box of a face region having a large deviation in the vertical direction can be excluded, i.e., a face region corresponding to a fourth selection box having the horizontal coordinate of a left edge greater than or equal to the horizontal coordinate of a right edge of the third selection box, and a face region corresponding to a fourth selection box having the horizontal coordinate of a right edge less than or equal to the horizontal coordinate of a left edge of the third selection box can be determined as non-target body regions.

In this way, multiple noisy face regions can be filtered to improve the recognition efficiency and improve the recognition accuracy.

In a possible implementation, a face region matching a body region of a target object can be determined from a first face region, i.e., a face region of a target object.

In one example, the distance between the coordinate of an upper edge midpoint of the third selection box and the coordinate of the central position of the fourth selection box can be determined, and a face region corresponding to the closest fourth selection box is determined, i.e., a second face region. If only one closest fourth selection box is included, the second face region corresponding to the fourth selection box can be determined as a face region of a target object.

In one example, if multiple fourth selection boxes having the same distance are included, i.e., multiple second face regions are included, an included angle between a line connecting the central position of a fourth selection box of a second face region to the central position of the third selection box and the vertical direction can be determined. The smaller the included angle, the closer the direction of the connecting line with respect to the vertical direction. A second face region of a fourth selection box having the smallest included angle can be determined as a face region of the target object. In an example, the cosine value of the included angle can be determined, and a second face region corresponding to a fourth selection box having the largest cosine value of the included angle can be determined as a face region of the target object. Furthermore, second location information of the face region of the target object can be determined.

In this way, the face region of the target object can be determined by calculating the coordinate to improve the processing efficiency.

In a possible implementation, at step S14, fourth location information of a face region of a target object in a first image, and fifth location information of a body region of a target object in a first image can be determined according to first location information, second location information, and third location information.

In an example, the fourth location information and the fifth location information can be determined by means of coordinate transformation. For example, the first location information is coordination information of the cropped image in a first image, and the coordinate of the upper left vertex of the cropped image is (x, y). For example, the second location information is coordination information of a face region of a target object in a cropped image, the coordinate of the upper left vertex of a selection box of a face region in the cropped image is $(a_1, b_1)$, and the coordinate of the lower right vertex of a selection box of a face region is $(a_2, b_2)$. The third location information is coordination information of a body region of a target object in a cropped image, the coordinate of the upper left vertex of a selection box of a body region in a cropped image is $(c_1, d_1)$, and the coordinate of the lower right vertex of a selection box of a face region is $(c_2, d_2)$. The fourth location information is coordination information of a face region of a target object in a first image. For example, the coordinate of the upper left vertex of a selection box of a face region in the first image is $(x+a_1, y+b_1)$, and the coordinate of the lower right vertex of a selection box of a face region is $(x+a_2, y+b_2)$. The coordinate of the upper left vertex of a selection box of a body/face region in a first image is $(x+c_1, y+d_1)$, and the coordinate of the lower right vertex of a selection box of a body region is $(x+c_2, y+d_2)$.

In a possible implementation, at step S14, a first image can be processed according to the fourth location information and the fifth location information. For example, a face region and a body region of a target object in a first image are annotated according to fourth location information and fifth location information, i.e., annotating a selection box selecting a face region and a body region of a target object, to obtain a second image.

In an example, an image to be processed includes video frames of a surveillance video. A face region and a body region of a target object can be annotated in video frames including the target object, and the track of the target object is determined according to location information of the face region and the body region of the target object in multiple video frames.

According to the image processing method in the embodiments of the present disclosure, a target region where a target object is located can be determined in a first image including the target object, and is cropped, a face region and a body region of the target object are determined in the cropped image, and an interference region can be filtered out to reduce the difficulty of matching the face region and the body region of the target object. Multiple noisy regions are filtered in the cropped image to improve the recognition efficiency and improve the recognition accuracy, and the face region or the body region of the target object can be determined by calculating the coordinate to improve the processing efficiency.

Figure 3:
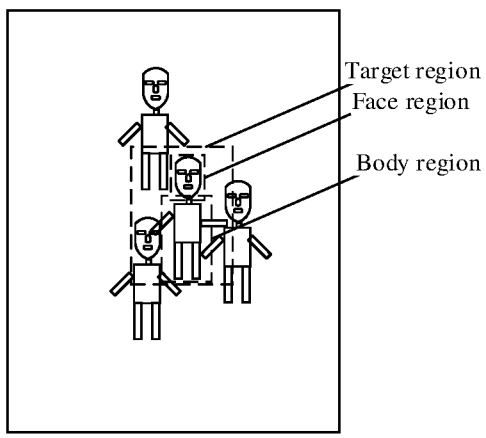
FIG. 3 is a schematic diagram of an application of an image processing method according to embodiments of the present disclosure.

FIG. 3 is a schematic diagram of an application of an image processing method according to embodiments of the present disclosure. As shown in FIG. 3, a face region or a body region of a target object can be performed feature extraction to obtain feature information of the target object, and search is conducted in an image to be processed according to the feature information of the target object to obtain a first image of the target object. First location information of a target region where the target object is located is determined in the first image, i.e., coordinate information of the target region in the first image. For example, the coordinate of the upper left vertex of the target region is (x, y), etc. The target region can be performed cropping processing to obtain a cropped image.

In a possible implementation, if the feature information is face feature information, a face region of a target object can be searched in a cropped image, and second location information of the face region of the target object in the cropped image can be determined. For example, the coordinate of the upper left vertex of a selection box of a face region in the cropped image is $(a_1, b_1)$, and the coordinate of the lower right vertex of a selection box of a face region is $(a_2, b_2)$.

In a possible implementation, a non-target body region in a cropped image can be filtered out, and third location information of a body region of a target object is determined in the remaining first body region according to the coordinate of a selection box of a face region and a body region. For example, the coordinate of the upper left vertex of a selection box of a body region in a cropped image is $(c_1, d_1)$, and the coordinate of the lower right vertex of a selection box of a face region is $(c_2, d_2)$.

In a possible implementation, if the feature information is body feature information, a body region of a target object can be searched in a cropped image, and third location information of the body region of the target object in the cropped image can be determined. For example, the coordinate of the upper left vertex of a selection box of a body region in a cropped image is $(c_1, d_1)$, and the coordinate of the lower right vertex of a selection box of a face region is $(c_2, d_2)$.

In a possible implementation, a non-target face region in a cropped image can be filtered out, and second location information of a face region of a target object is determined in the remaining first face region according to the coordinate of a selection box of a face region and a body region. For example, the coordinate of the upper left vertex of a selection box of a face region in a cropped image is ($a_1$, $b_1$), and the coordinate of the lower right vertex of a selection box of a face region is ($a_2$, $b_2$).

In a possible implementation, location information of a face region and a body region of a target object in a first image can be determined by means of coordinate transformation. For example, the coordinate of the upper left vertex of a selection box of a face region in a first image is ($x+a_1$, $y+b_1$), and the coordinate of the lower right vertex of a selection box of a face region is ($x+a_2$, $y+b_2$). The coordinate of the upper left vertex of a selection box of a body/face region in a first image is ($x+c_1$, $y+d_1$), and the coordinate of the lower right vertex of a selection box of a body region is ($x+c_2$, $y+d_2$).

In a possible implementation, a selection box selecting a face region and a body region of a target object can be annotated in a first image according to the coordinate.

In a possible implementation, the image processing method can be used for determining the location of a target object in a large variety of surveillance videos according to incomplete feature information, and monitoring and tracking the target object. For example, the method can be used for helping the police locate a suspect in a surveillance video.

Figure 4:
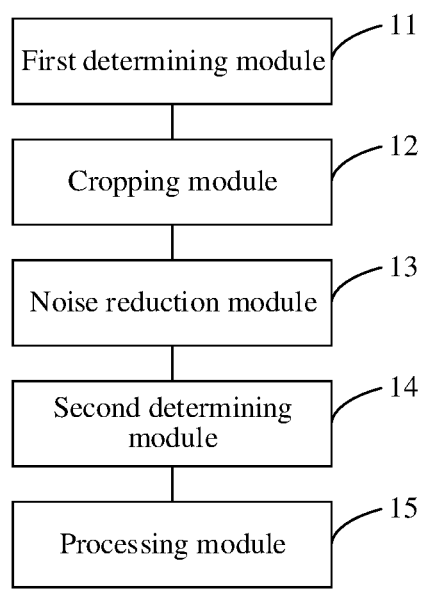
FIG. 4 is a block diagram illustrating an image processing apparatus according to embodiments of the present disclosure.

FIG. 4 is a block diagram illustrating an image processing apparatus according to embodiments of the present disclosure. As shown in FIG. 4, the apparatus includes:

a first determining module 11, configured to determine, according to a reference image, a first image including a target object in the reference image from multiple images to be processed, and first location information of a target region where the target object is located in the first image;

a cropping module 12, configured to perform cropping processing on the target region to obtain a cropped image;

a noise reduction module 13, configured to perform noise reduction processing on the cropped image according to the reference image, and determine second location information of a face region of the target object and third location information of a body region of the target object in the cropped image;

a second determining module 14, configured to determine fourth location information of the face region of the target object and fifth location information of the body region of the target object in the first image according to the first location information, the second location information, and the third location information; and a processing module 15, configured to process the first image according to the fourth location information and the fifth location information to obtain a second image, where the second image includes labeling information for the face region and the body region of the target object.

In a possible implementation, the first determining module is configured to: obtain feature information of the target object in the reference image, where the feature information includes face feature information and/or body feature information; determine, according to the feature information of the target object, the first image including the target object from the multiple images to be processed; and determine the first location information of the target region where the target object is located in the first image.

In a possible implementation, the feature information of the target object includes face feature information of the target object.

The noise reduction module is configured to: determine, according to the face feature information of the target object in the reference image, the second location information of the face region of the target object in the cropped image; determine location information of multiple body regions in the cropped image; and perform noise reduction processing on the multiple body regions in the cropped image according to the second location information, and determine the third location information of the body region of the target object in the cropped image.

In a possible implementation, the second location information includes coordinate information of a first selection box selecting the face region of the target object, and location information of a body region in the cropped image includes coordinate information of a second selection box selecting the body region.

The noise reduction module is configured to: filter out, according to the second location information and location information of the body regions in the cropped image, a non-target body region in the cropped image to obtain a first body region; screen a second body region from the first body region according to the distance between the coordinate of the central position of the first selection box and the coordinate of an upper edge midpoint of the second selection box; and determine the body region of the target object and the third location information of the body region of the target object from the second body region according to an included angle between a line connecting the central position of the second selection box of the second body region to the central position of the first selection box and the vertical direction.

In a possible implementation, the non-target body region includes at least one of the following: a body region corresponding to a second selection box having no intersection with the first selection box; a body region corresponding to a second selection box having the vertical coordinate of the central position greater than or equal to the vertical coordinate of a lower edge of the first selection box; a body region corresponding to a second selection box having the horizontal coordinate of a left edge greater than or equal to the horizontal coordinate of a right edge of the first selection box; and a body region corresponding to a second selection box having the horizontal coordinate of a right edge less than or equal to the horizontal coordinate of a left edge of the first selection box.

In a possible implementation, the feature information of the target object includes body feature information of the target object.

The noise reduction module is configured to: determine, according to the body feature information of the target object in the reference image, the third location information of the body region of the target object in the cropped image; determine location information of multiple face regions in the cropped image; and perform noise reduction processing on the multiple face regions in the cropped image according to the third location information, and determine the second location information of the face region of the target object in the cropped image.

In a possible implementation, the third location information includes coordinate information of a third selection box selecting the body region of the target object, and location information of a face region in the cropped image includes coordinate information of a fourth selection box selecting the face region.

The noise reduction module is configured to: filter out, according to the third location information and location information of the face regions in the cropped image, a non-target face region in the cropped image to obtain a first face region; screen a second face region from the first face region according to the distance between the coordinate of an upper edge midpoint of the third selection box and the coordinate of the central position of the fourth selection box; and determine the face region of the target object and the second location information of the face region of the target object from the second face region according to an included angle between a line connecting the central position of the fourth selection box of the second body region to the central position of the third selection box and the vertical direction.

In a possible implementation, the non-target face region includes at least one of the following: a face region corresponding to a fourth selection box having no intersection with the third selection box; a face region corresponding to a fourth selection box having the vertical coordinate of a lower edge less than or equal to the vertical coordinate of the central position of the third selection box; a face region corresponding to a fourth selection box having the horizontal coordinate of a left edge greater than or equal to the horizontal coordinate of a right edge of the third selection box; and a face region corresponding to a fourth selection box having the horizontal coordinate of a right edge less than or equal to the horizontal coordinate of a left edge of the third selection box.

It can be understood that the foregoing various method embodiments mentioned in the present disclosure may be combined with each other to form a combined embodiment without departing from the principle logic. Details are not described herein again due to space limitation.

In addition, the present disclosure further provides an image processing apparatus, an electronic device, a computer readable storage medium, and a program, which can all be configured to implement any one of the image processing methods provided in the present disclosure. For the corresponding technical solutions and descriptions, please refer to the corresponding contents in the method parts. Details are not described herein again.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

In some embodiments, the functions provided by or the modules included in the apparatuses provided by the embodiments of the present disclosure may be used to implement the methods described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where when the computer program instructions are executed by a processor, the foregoing methods are implemented. The computer-readable storage medium may be a non-volatile computer-readable storage medium or a volatile storage medium.

The embodiments of the present disclosure further provide an electronic device, including: a processor; and a memory configured to store processor-executable instructions, where the processor is configured to execute the foregoing methods.

The electronic device may be provided as a terminal, a server, or devices in other forms.

Figure 5:
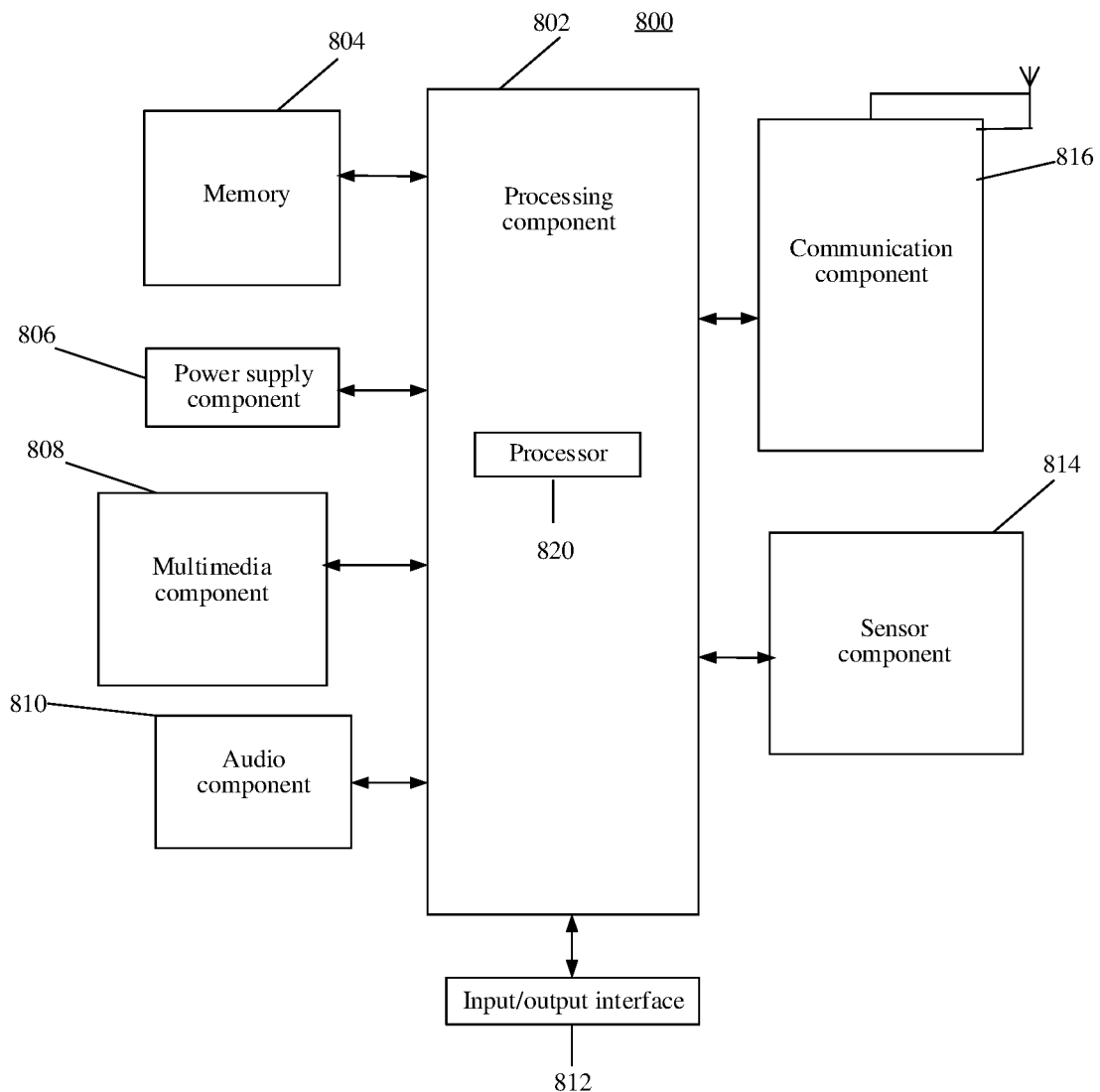
FIG. 5 is a block diagram illustrating an electronic device according to embodiments of the present disclosure.

FIG. 5 is a block diagram of an electronic device 800 according to an exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 5, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 generally controls overall operation of the electronic device 800, such as operations associated with display, phone calls, data communications, camera operations, and recording operations. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, ultra-wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the method above.

Figure 6:
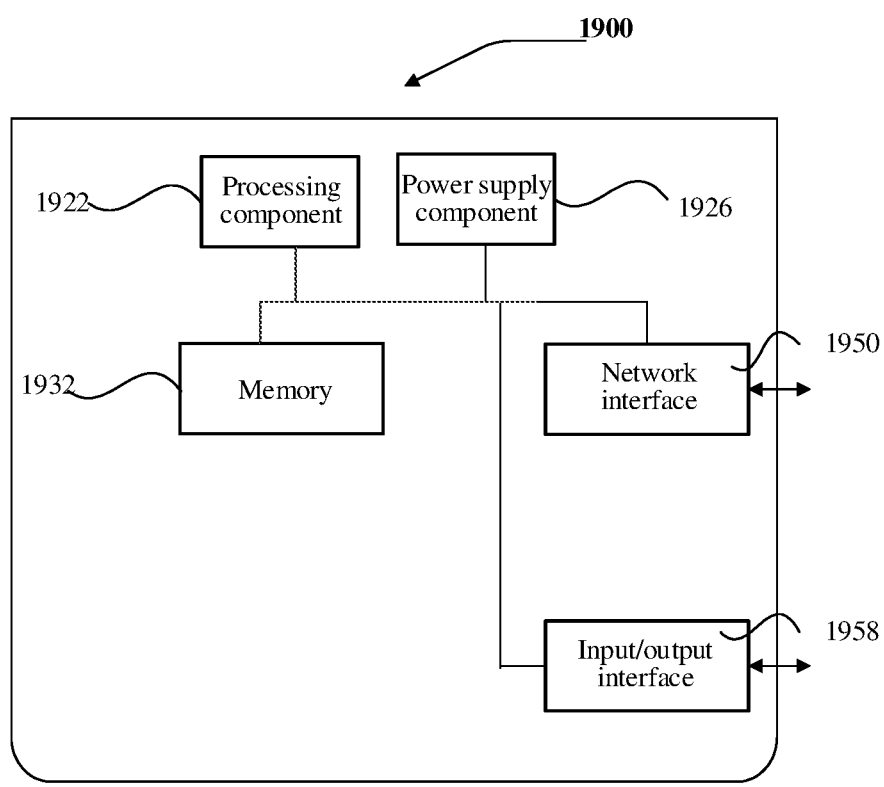
FIG. 6 is a block diagram illustrating an electronic device according to embodiments of the present disclosure.

FIG. 6 is a block diagram of an electronic device 1900 according to an exemplary embodiment. For example, the electronic device 1900 may be provided as a server. With reference to FIG. 6, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can be executed by the processing component 1922 of the electronic device 1900 to implement the method above.

The present disclosure may be a system, a method, and/or a computer program product. The computer program product may include a computer readable storage medium having computer readable program instructions thereon for enabling a processor to implement aspects of the present disclosure.

The computer readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an Erasable Programmable Read-Only Memory (EPROM or Flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may computer copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer readable program instructions may be executed completely on a user computer, executed partially on the user computer, executed as an independent software package, executed partially on the user computer and partially on a remote computer, or executed completely on the remote computer or server. In a scenario involving a remote computer, the remote computer may be connected to the user's computer through any type of network, including a LAN or a WAN, or the connection may be made to an external computer (for example, through the Internet using an Internet service provider). In some embodiments, electronic circuitry including, for example, programmable logic circuitry, Field-Programmable Gate Arrays (FGPAs), or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart or block diagram may represent a module, program segment, or portion of instruction, which includes one or more executable instructions for executing the specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. An image processing method, comprising:
    determining, according to a reference image, a first image comprising a target object in the reference image from multiple images to be processed, and first location information of a target region where the target object is located in the first image;
    performing cropping processing on the target region to obtain a cropped image;
    performing, according to the reference image, noise reduction processing on the cropped image, and determining second location information of a face region of the target object and third location information of a body region of the target object in the cropped image;
    determining, according to the first location information, the second location information, and the third location information, fourth location information of the face region of the target object and fifth location information of the body region of the target object in the first image; and
    processing, according to the fourth location information and the fifth location information, the first image to obtain a second image, wherein the second image comprises labeling information for the face region and the body region of the target object;
    wherein determining, according to the reference image, the first image comprising the target object in the reference image from the multiple images to be processed, and the first location information of the target region where the target object is located in the first image comprises:
        obtaining feature information of the target object in the reference image, wherein the feature information comprises at least one of face feature information or body feature information;
        determining, according to the feature information of the target object, the first image comprising the target object from the multiple images to be processed; and determining the first location information of the target region where the target object is located in the first image, wherein, in response to the feature information of the target object comprising the face feature information of the target object, performing, according to the reference image, noise reduction processing on the cropped image, and determining the second location information of the face region of the target object and the third location information of the body region of the target object in the cropped image comprises:

determining, according to the face feature information of the target object in the reference image, the second location information of the face region of the target object in the cropped image;

determining location information of multiple body regions in the cropped image; and performing, according to the second location information, noise reduction processing on the multiple body regions in the cropped image, and determining the third location information of the body region of the target object in the cropped image.

2. The method according to claim 1, wherein the second location information comprises coordinate information of a first selection box for selecting the face region of the target object, and location information of a body region in the cropped image comprises coordinate information of a second selection box for selecting the body region;

performing, according to the second location information, noise reduction processing on the multiple body regions in the cropped image, and determining the third location information of the body region of the target object in the cropped image comprises:

filtering out, according to the second location information and the location information of the multiple body regions in the cropped image, a non-target body region in the cropped image to obtain a first body region;

screening, according to a distance between a coordinate of a central position of the first selection box and a coordinate of an upper edge midpoint of the second selection box, a second body region from the first body region; and determining, according to an included angle between a line connecting a central position of the second selection box of the second body region to the central position of the first selection box and a vertical direction, the body region of the target object and the third location information of the body region of the target object from the second body region.

3. The method according to claim 2, wherein the non-target body region comprises at least one of the following:

a body region corresponding to a second selection box having no intersection with the first selection box;

a body region corresponding to a second selection box having a vertical coordinate of the central position greater than or equal to a vertical coordinate of a lower edge of the first selection box;

a body region corresponding to a second selection box having a horizontal coordinate of a left edge greater than or equal to a horizontal coordinate of a right edge of the first selection box; or a body region corresponding to a second selection box having a horizontal coordinate of a right edge less than or equal to a horizontal coordinate of a left edge of the first selection box.

4. The method according to claim 1, wherein in response to the feature information of the target object comprising the body feature information of the target object, performing, according to the reference image, noise reduction processing on the cropped image, and determining the second location information of the face region of the target object and the third location information of the body region of the target object in the cropped image comprises:

determining, according to the body feature information of the target object in the reference image, the third location information of the body region of the target object in the cropped image;

determining location information of multiple face regions in the cropped image; and performing, according to the third location information, noise reduction processing on the multiple face regions in the cropped image, and determining the second location information of the face region of the target object in the cropped image.

5. The method according to claim 4, wherein the third location information comprises coordinate information of a third selection box for selecting the body region of the target object, and location information of a face region in the cropped image comprises coordinate information of a fourth selection box for selecting the face region;

performing, according to the third location information, noise reduction processing on the multiple face regions in the cropped image, and determining the second location information of the face region of the target object in the cropped image comprises:

filtering out, according to the third location information and location information of the multiple face regions in the cropped image, a non-target face region in the cropped image to obtain a first face region;

screening, according to a distance between a coordinate of an upper edge midpoint of the third selection box and a coordinate of a central position of the fourth selection box, a second face region from the first face region; and determining, according to an included angle between a line connecting the central position of the fourth selection box of the second face region to a central position of the third selection box and a vertical direction, the face region of the target object and the second location information of the face region of the target object from the second face region.

6. The method according to claim 5, wherein the non-target face region comprises at least one of the following:

a face region corresponding to a fourth selection box having no intersection with the third selection box;

a face region corresponding to a fourth selection box having a vertical coordinate of a lower edge less than or equal to a vertical coordinate of the central position of the third selection box;

a face region corresponding to a fourth selection box having a horizontal coordinate of a left edge greater than or equal to a horizontal coordinate of a right edge of the third selection box; or a face region corresponding to a fourth selection box having a horizontal coordinate of a right edge less than or equal to a horizontal coordinate of a left edge of the third selection box.

7. An image processing apparatus, comprising:
a processor; and
a memory configured to store processor-executable instructions, wherein when the processor-executable instructions are executed by the processor, the processor is configured to:
  determine, according to a reference image, a first image comprising a target object in the reference image from multiple images to be processed, and first location information of a target region where the target object is located in the first image;
  perform cropping processing on the target region to obtain a cropped image;
  perform, according to the reference image, noise reduction processing on the cropped image, and determine second location information of a face region of the target object and third location information of a body region of the target object in the cropped image;
  determine, according to the first location information, the second location information, and the third location information, fourth location information of the face region of the target object and fifth location information of the body region of the target object in the first image; and
  process, according to the fourth location information and the fifth location information, the first image to obtain a second image, wherein the second image comprises labeling information for the face region and the body region of the target object;
  wherein the processor is further configured to: obtain feature information of the target object in the reference image, wherein the feature information comprises at least one of face feature information or body feature information; determine, according to the feature information of the target object, the first image comprising the target object from the multiple images to be processed; and determine the first location information of the target region where the target object is located in the first image,
  wherein, in response to the feature information of the target object comprising the face feature information of the target object, the processor is further configured to:
    determine, according to the face feature information of the target object in the reference image, the second location information of the face region of the target object in the cropped image; determine location information of multiple body regions in the cropped image; and perform, according to the second location information, noise reduction processing on the multiple body regions in the cropped image, and determine the third location information of the body region of the target object in the cropped image.

8. The apparatus according to claim 7, wherein the second location information comprises coordinate information of a first selection box for selecting the face region of the target object, and location information of a body region in the cropped image comprises coordinate information of a second selection box for selecting the body region;
  the processor is further configured to: filter out, according to the second location information and the location information of the multiple body regions in the cropped image, a non-target body region in the cropped image to obtain a first body region; screen, according to a distance between a coordinate of a central position of the first selection box and a coordinate of an upper edge midpoint of the second selection box, a second body region from the first body region; and determine, according to an included angle between a line connecting a central position of the second selection box of the second body region to the central position of the first selection box and a vertical direction, the body region of the target object and the third location information of the body region of the target object from the second body region.

9. The apparatus according to claim 8, wherein the non-target body region comprises at least one of the following:
  a body region corresponding to a second selection box having no intersection with the first selection box;
  a body region corresponding to a second selection box having a vertical coordinate of the central position greater than or equal to a vertical coordinate of a lower edge of the first selection box;
  a body region corresponding to a second selection box having a horizontal coordinate of a left edge greater than or equal to a horizontal coordinate of a right edge of the first selection box; or
  a body region corresponding to a second selection box having a horizontal coordinate of a right edge less than or equal to a horizontal coordinate of a left edge of the first selection box.

10. The apparatus according to claim 7, wherein in response to the feature information of the target object comprising the body feature information of the target object, the processor is further configured to:
  determine, according to the body feature information of the target object in the reference image, the third location information of the body region of the target object in the cropped image; determine location information of multiple face regions in the cropped image; and perform, according to the third location information, noise reduction processing on the multiple face regions in the cropped image, and determine the second location information of the face region of the target object in the cropped image.

11. The apparatus according to claim 10, wherein the third location information comprises coordinate information of a third selection box for selecting the body region of the target object, and location information of a face region in the cropped image comprises coordinate information of a fourth selection box for selecting the face region;
  the processor is further configured to: filter out, according to the third location information and location information of the multiple face regions in the cropped image, a non-target face region in the cropped image to obtain a first face region; screen, according to a distance between a coordinate of an upper edge midpoint of the third selection box and a coordinate of a central position of the fourth selection box, a second face region from the first face region; and determine, according to an included angle between a line connecting the central position of the fourth selection box of the second face region to a central position of the third selection box and a vertical direction, the face region of the target object and the second location information of the face region of the target object from the second face region.

12. The apparatus according to claim 11, wherein the non-target face region comprises at least one of the following:
  a face region corresponding to a fourth selection box having no intersection with the third selection box;
  a face region corresponding to a fourth selection box having a vertical coordinate of a lower edge less than or equal to a vertical coordinate of the central position of the third selection box;

a face region corresponding to a fourth selection box having a horizontal coordinate of a left edge greater than or equal to a horizontal coordinate of a right edge of the third selection box; or a face region corresponding to a fourth selection box having a horizontal coordinate of a right edge less than or equal to a horizontal coordinate of a left edge of the third selection box.

13. A non-transitory computer-readable storage medium, having computer program instructions stored thereon, wherein when the computer program instructions are executed by a processor, the following operations are performed:

determining, according to a reference image, a first image comprising a target object in the reference image from multiple images to be processed, and first location information of a target region where the target object is located in the first image;

performing cropping processing on the target region to obtain a cropped image;

performing, according to the reference image, noise reduction processing on the cropped image, and determining second location information of a face region of the target object and third location information of a body region of the target object in the cropped image;

determining, according to the first location information, the second location information, and the third location information, fourth location information of the face region of the target object and fifth location information of the body region of the target object in the first image; and processing, according to the fourth location information and the fifth location information, the first image to obtain a second image, wherein the second image comprises labeling information for the face region and the body region of the target object;

wherein determining, according to the reference image, the first image comprising the target object in the reference image from the multiple images to be processed, and the first location information of the target region where the target object is located in the first image comprises:

obtaining feature information of the target object in the reference image, wherein the feature information comprises at least one of face feature information or body feature information;

determining, according to the feature information of the target object, the first image comprising the target object from the multiple images to be processed; and determining the first location information of the target region where the target object is located in the first image, wherein, in response to the feature information of the target object comprising the face feature information of the target object, performing, according to the reference image, noise reduction processing on the cropped image, and determining the second location information of the face region of the target object and the third location information of the body region of the target object in the cropped image comprises:

determining, according to the face feature information of the target object in the reference image, the second location information of the face region of the target object in the cropped image;

determining location information of multiple body regions in the cropped image; and performing, according to the second location information, noise reduction processing on the multiple body regions in the cropped image, and determining the third location information of the body region of the target object in the cropped image.

14. The non-transitory computer-readable storage medium according to claim 13, wherein the second location information comprises coordinate information of a first selection box for selecting the face region of the target object, and location information of a body region in the cropped image comprises coordinate information of a second selection box for selecting the body region;

performing, according to the second location information, noise reduction processing on the multiple body regions in the cropped image, and determining the third location information of the body region of the target object in the cropped image comprises:

filtering out, according to the second location information and the location information of the multiple body regions in the cropped image, a non-target body region in the cropped image to obtain a first body region;

screening, according to a distance between a coordinate of a central position of the first selection box and a coordinate of an upper edge midpoint of the second selection box, a second body region from the first body region; and determining, according to an included angle between a line connecting a central position of the second selection box of the second body region to the central position of the first selection box and a vertical direction, the body region of the target object and the third location information of the body region of the target object from the second body region.

15. The non-transitory computer-readable storage medium according to claim 14, wherein the non-target body region comprises at least one of the following:

a body region corresponding to a second selection box having no intersection with the first selection box;

a body region corresponding to a second selection box having a vertical coordinate of the central position greater than or equal to a vertical coordinate of a lower edge of the first selection box;

a body region corresponding to a second selection box having a horizontal coordinate of a left edge greater than or equal to a horizontal coordinate of a right edge of the first selection box; or a body region corresponding to a second selection box having a horizontal coordinate of a right edge less than or equal to a horizontal coordinate of a left edge of the first selection box.

16. The non-transitory computer-readable storage medium according to claim 13, wherein, in response to the feature information of the target object comprising the body feature information of the target object, performing, according to the reference image, noise reduction processing on the cropped image, and determining the second location information of the face region of the target object and the third location information of the body region of the target object in the cropped image comprises:

determining, according to the body feature information of the target object in the reference image, the third location information of the body region of the target object in the cropped image;

determining location information of multiple face regions in the cropped image; and performing, according to the third location information, noise reduction processing on the multiple face regions in the cropped image, and determining the second location information of the face region of the target object in the cropped image.

17. The non-transitory computer-readable storage medium according to claim 16, wherein the third location information comprises coordinate information of a third selection box for selecting the body region of the target object, and location information of a face region in the cropped image comprises coordinate information of a fourth selection box for selecting the face region;

performing, according to the third location information, noise reduction processing on the multiple face regions in the cropped image, and determining the second location information of the face region of the target object in the cropped image comprises:

filtering out, according to the third location information and location information of the multiple face regions in the cropped image, a non-target face region in the cropped image to obtain a first face region;

screening, according to a distance between a coordinate of an upper edge midpoint of the third selection box and a coordinate of a central position of the fourth selection box, a second face region from the first face region; and determining, according to an included angle between a line connecting the central position of the fourth selection box of the second face region to a central position of the third selection box and a vertical direction, the face region of the target object and the second location information of the face region of the target object from the second face region.

18. The non-transitory computer-readable storage medium according to claim 17, wherein the non-target face region comprises at least one of the following:

a face region corresponding to a fourth selection box having no intersection with the third selection box;

a face region corresponding to a fourth selection box having a vertical coordinate of a lower edge less than or equal to a vertical coordinate of the central position of the third selection box;

a face region corresponding to a fourth selection box having a horizontal coordinate of a left edge greater than or equal to a horizontal coordinate of a right edge of the third selection box; or a face region corresponding to a fourth selection box having a horizontal coordinate of a right edge less than or equal to a horizontal coordinate of a left edge of the third selection box.

\* \* \* \* \*